United States Patent [19]

Victor

[11] 3,999,926
[45] Dec. 28, 1976

[54] APPARATUS FOR SHAPING DOUGH LUMPS
[75] Inventor: Maurice Victor, Meru, France
[73] Assignee: Machines Bertrand S.A., Paris, France
[22] Filed: Mar. 4, 1976
[21] Appl. No.: 663,813
[30] Foreign Application Priority Data
  Mar. 11, 1975   France .......................... 75.07516
[52] U.S. Cl. ............................... 425/337; 198/414
[51] Int. Cl.² ........................................ A21C 3/02
[58] Field of Search .......... 425/337, 335, 336, 385, 425/471; 198/236, 237, 281, 284

[56] References Cited
UNITED STATES PATENTS

| | | | |
|---|---|---|---|
| 1,763,620 | 6/1930 | Wolfarth et al. | 425/337 |
| 1,871,753 | 8/1932 | Smith | 425/337 |
| 2,850,142 | 9/1958 | Engelson et al. | 198/236 |
| 3,883,283 | 5/1975 | Herrera | 425/337 |

Primary Examiner—Richard B. Lazarus
Assistant Examiner—N. R. Briggs
Attorney, Agent, or Firm—Michael J. Striker

[57] ABSTRACT

Apparatus for converting a dough lump or the like into a flat, substantially circular disk, notably for making various pastry products or pizzas, pies, etc.; underlying a feed hopper is a first train of rolling rollers adapted to elongate the lump in a first direction and to deposit same onto a pivoting transfer tray having a certain inclination, the weight of said lump causing said tray to pivot so as to introduce the lump in a direction at right angles to said first direction into a second train of rolling rollers for imparting the desired, substantially circular shape to said lump and delivering the latter to a discharge chute.

5 Claims, 4 Drawing Figures

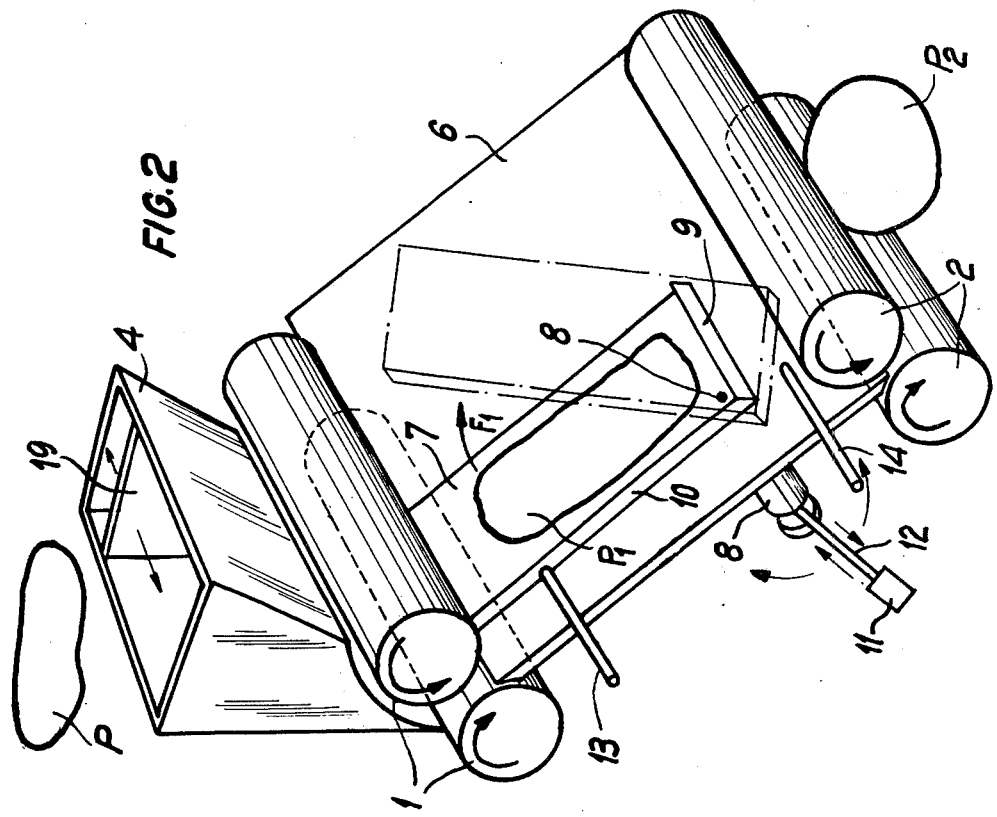
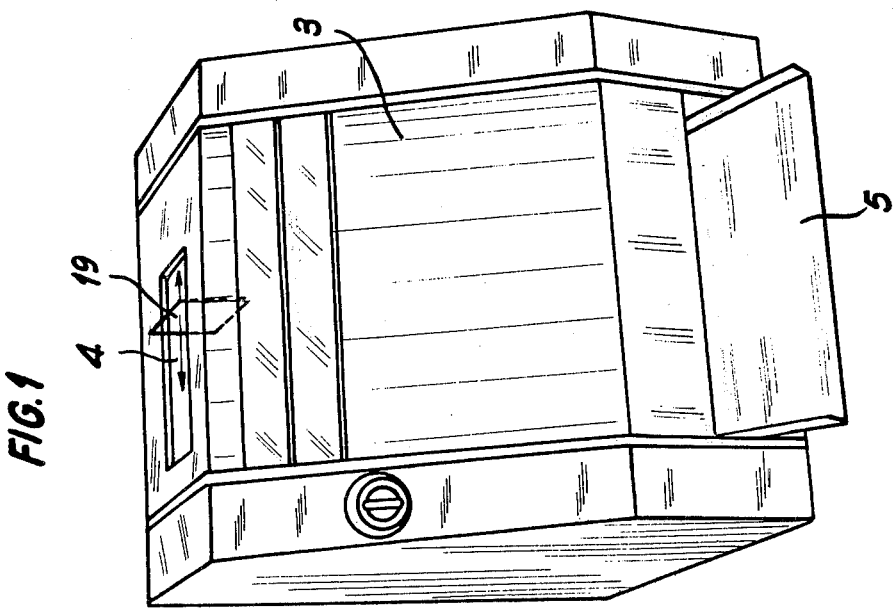

APPARATUS FOR SHAPING DOUGH LUMPS

BACKGROUND OF THE INVENTION

1. Field of the Invention

The present invention relates in general to the preparation of lumps of dough or like pasty material, and has specific reference to an apparatus for this specific application, notably for preparing various foods or in the bakery or pastry industry.

2. Description of the Invention

Many apparatus have already been proposed for preparing dough lumps. However, these known apparatus consist as a rule of relatively bulky dough mixing machines designed for use in bakeries, notably industrial bakeries. In contrast thereto, the scope of the present invention is to provide an apparatus of relatively reduced overall dimensions and very simple design, intended more particularly for preparing a lump of dough or like pasty material in the form of a flat sheet or disk of substantially circular shape, adapted for use for example for making pizzas or pies, or other food or pastry specialties, both commercially and for home use.

For this purpose, the apparatus according to this invention comprises two trains of parallel or substantially parallel rolling rollers and a pivoting transfer tray disposed between said trains and adapted to receive the lump of dough released by the rollers of the first train and transfer said lump to the rollers of the other train after pivoting said tray about its pivot pin for changing the lump orientation for example by 90°.

Thus, the lump to be shaped is elongated twice in two directions perpendicular to each other. Therefore, when the lump emerges from the second train of rollers and from the apparatus itself it has a circular or nearly circular configuration and can be used without any subsequent handling for making a wide range of culinary or pastry specialties, such as pizzas or pies.

According to an advantageous form of embodiment of the apparatus of this invention, the pivoting transfer tray is arranged, and its pivot pin is disposed, in such a manner that the pivotal movement of said tray from its lump-receiving position to its lump transfer position is caused simply by the weight of this lump.

However, a return member such as a spring or a counterweight is provided for constantly urging the pivoting tray to a position in which it can properly receive the lump emerging from the rollers of the first rolling train.

BRIEF DESCRIPTION OF THE DRAWING

FIG. 1 is a perspective view illustrating diagrammatically a typical form of embodiment of an apparatus constructed according to the teachings of this invention;

FIG. 2 is a diagrammatic perspective view of the essential component elements of the apparatus, the housing thereof being removed to simplify the drawing.

DESCRIPTION OF THE PREFERRED EMBODIMENT

Figure 3:
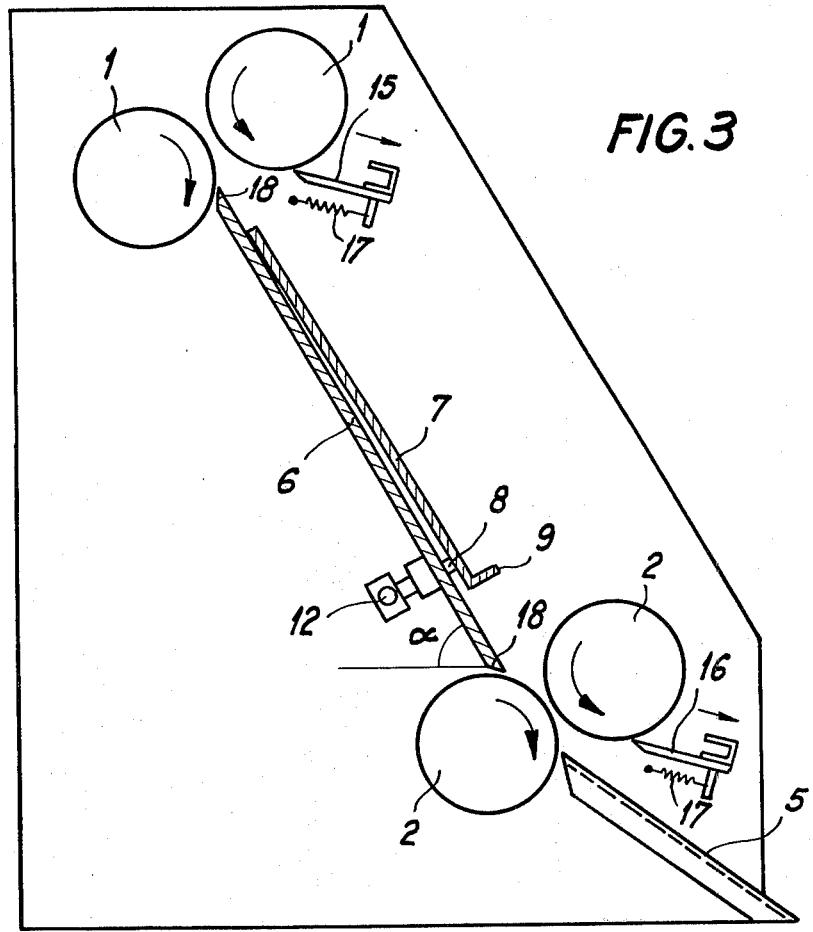
FIG. 3 is a vertical cross section of the same apparatus.

The apparatus according to this invention for preparing lumps of dough or like pasty materials, as illustrated in the drawing, comprises two upper and lower trains or pairs of rolling rollers designated by the reference numerals 1 and 2, respectively, and mounted in a frame (not shown) enclosed in a housing 3. Arranged at the top of this housing 3 is a hopper or spout 4 for introducing the lump to be shaped into the apparatus. On the other hand, a discharge inclined ramp or chute 5 is provided at the bottom of the apparatus, adjacent the lower pair of rollers 2.

Both pairs of rollers 1 and 2 are disposed on either side of a fixed apron 6 rigid with the frame or housing of the apparatus with an inclination $\alpha$ (see FIG. 3) to the horizontal, this angle $\alpha$ being of the order of 45° to 60°. However, this apron may also be disposed at an angle of approximately 90° to the horizontal.

The axes of both trains of rollers 1 and 2 are disposed horizontally and parallel to each other and to the apron 5.

According to an essential feature characterizing this invention, a movable transfer tray is pivotally mounted on the apron 6 between the two pairs of rollers and adapted to receive each lump issuing from the nip of the upper pair of rollers for transferring said lump to the nip of the lower pair of rollers.

In the example illustrated in FIGS. 1 to 3 this transfer tray consists of a plate 7 of rectangular configuration, pivoted to a pin 8 carried by the fixed apron 6 and located adjacent one of its lower corners, in this example the bottom left-hand corner, as shown.

This pivoting tray, as shown in thick lines in FIG. 2, is normally positioned in a waiting position so that the top and bottom edges of the tray 7 extend substantially horizontally. Thus, the tray 7 is adapted to pivot in the clockwise direction as seen in FIG. 2, i.e. in the direction of arrow $F_1$, to the position shown in dash and dot lines.

The tray 7 comprises a retaining ledge 9 or 10, projecting from the bottom edge and from the major side edge of the tray, adjacent the pivot pin 8. On the other hand, the opposite major side edge and top edge are free of any projecting ledge. With this arrangement, the flattened lump emerging from the first or upper train of rollers 1 can slip freely on this tray 7 and is retained by the bottom ledge 9 thereof. Said ledge constitutes a stop member disposed across the path of the lump and adapted to be struck by said lump to cause the tray 7 to pivot in the direction of the arrow $F_1$, together with the previously rolled lump. Afterwards said lump will slip out from the tray 7 and engage the nip of the underlying pair of rollers 2.

It may be emphasized that the pivotal movement of tray 7 takes place automatically by gravity, due to the weight of said dough lump $P_1$, when the latter abuts the lower ledge 9. This is due to the proper positioning of the pivot pin 8. In fact, according to an essential feature characterizing this invention, the pivot pin 8 is disposed eccentrically and, more particularly, located adjacent one of the lower corners of the tray. Suitable return means are provided for returning the tray 7 to its waiting position (shown in thick lines in FIG. 2) after the lump $P_1$ has been discharged therefrom. This return means as shown in the example illustrated may consist of a counterweight 11 carried by an arm 12 rigid with the pivot pin 8 of plate 7. Preferably, this counterweight consists of a nut engaging a threaded portion of arm 12, to permit the adjustment of said means. However, any other suitable means may be substituted for this counterweight, such as a return spring, a magnet, etc.

Moreover, either of the two end positions of the pivoting tray 7 are determined by adjustable stops shown diagrammatically at 13 and 14, respectively. On the other hand, a doctor blade is associated with each one of the upper rollers of the two trains 1 and 2, as shown at 15 and 16 in FIG. 3. Each doctor blade is slidably mounted and responsive to a spring 17 urging same against the companion roller. The ends 18 of the fixed apron 6 are bevelled to act as scrapers with respect to the lower rollers of both trains 1 and 2.

OPERATION

The lump P to be shaped is introduced into the feed hopper or spout 4 and thus caused to be rolled, flattened or squeezed by the pair of upper rollers 1, whereby the lump is elongated to form a preliminary sheet $P_1$ illustrated in FIG. 2 on the pivoting tray 7 acting as a transfer receptacle. In fact, as it is released from the nip of rollers 1, the flattened lump will slip on the surface of tray 7 and be stopped by the lower ledge 9.

As already mentioned in the foregoing, this impact causes the tray 7 to pivot in the direction of the arrow F. Since the inner major side of the tray 7 is free of any ledge, the flattened lump $P_1$ is discharged laterally and slips on the fixed apron 6 before engaging the nip of the lower pair of rollers 2. It is clear that this pivotal movement of tray 7 causes the lump $P_1$ to be oriented differently, this change corresponding for example to an angle of about 90°. Now this is essential for obtaining the desired result. In fact, having undergone a first elongation in the direction of a first axis, the lump is now elongated in the direction of another axis perpendicular to the first axis, whereby the same flattened lump $P_2$ delivered from the nip of the lower train or pair of rollers 2 has a circular or substantially circular configuration. Therefore, the sheet of dough issuing from the apparatus of this invention can be utilized immediately for preparing a wide range of pastry products or pizzas.

It will readily occur to those conversant with the art that this apparatus is extremely simple from the constructional point of view and requires only a small electric motor for driving the two trains of rolling rollers 1 and 2. Besides, the overall dimensions of the apparatus are relatively moderate, and the apparatus can be utilized in many shops of relatively reduced size.

As already mentioned hereinabove, this apparatus is intended primarily for shaping dough lumps in the preparation of pastry products or pizzas. However, it can also be used for shaping all kinds of lumps of pasty or like materials in order to impart a circular or nearly circular contour thereto.

Figure 4:
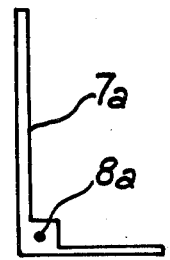
FIG. 4 is a detail view showing a modified form of embodiment of the pivoting transfer tray of the apparatus.

This apparatus may lend itself to many modifications and various forms of embodiment without departing from its basic principles. Thus, as illustrated in FIG. 4, the tray 7 constituting the pivoting transfer member disposed between the two trains of rolling rollers 1 and 2, may be replaced by a simple right-angle square or "L" shaped bracket 7a adapted to pivot about a horizontal hinge pin 8a adjacent its corner. This square-like member is disposed close to the fixed apron 6 in the same manner as the pivoting tray 7 so that it has the same function, i.e., transferring the flattened lump from the first train 1 to the second train 2.

Of course, an endless belt conveyor or any other suitable transport means may be substituted for the lower ramp or chute 5 for discharging the shaped lumps. Preferably, adjustment means of known type are provided for modifying at will the relative spacing of the rollers of each train. Besides, the feed hopper or spout 4 may advantageously be provided with an adjustable lateral partition 19 for reducing the transverse dimension of the opening through which the lumps to be shaped are introduced into the apparatus.

Having thus described and ascertained my present invention, I declare that what I claim as new is:

1. Apparatus for shaping a lump of pasty material into a flat disk of substantially circular contour, which comprises in combination a first train of rolling rollers adapted to receive each lump as it is introduced into the apparatus; a second train of rolling rollers disposed at a level substantially lower than that of said first train; between said two trains of rollers, means for receiving the lump as it is delivered from said first train of rollers, a pivot pin connected to and arranged eccentrically with respect to said receiving means for pivoting said receiving means between a first waiting position to a second position in which the lump can be released and directed towards said second train of rollers, said receiving means comprising a member disposed across the path of the lump to be struck by said lump to cause an imbalance so that said receiving means will pivot about said pivot pin towards the lump release position for delivering said lump to said second train of rollers.

2. Apparatus as recited in claim 1, further comprising return means to urge said pivoting receiving means in said first waiting position.

3. Apparatus as recited in claim 1, wherein said pivoting receiving means comprise an "L" shaped bracket disposed on an adjacent fixed inclined apron that acts as a bearing surface for the lump to be transferred, the pivot pin of said "L" shaped bracket being located adjacent the corner of said "L" shaped bracket, the lower arm of said "L" shaped bracket constituting said member disposed across the path of the lump and adapted to be struck by said lump for pivoting said "L" shaped bracket.

4. Apparatus as recited in claim 1, wherein said pivoting receiving means comprise a rectangular tray having an L-sectioned ledge extending along its lower edge and along one of its lateral edges, the pivot pin of said tray being located adjacent the corner thereof corresponding to the elbow of said L-sectioned ledge, the lower arm of said ledge constituting the member to be engaged by said lump for pivoting said tray.

5. Apparatus as recited in claim 1, further comprising a pair of adjustable stops for determining the two useful end positions of said pivoting transfer receiving means.

* * * * *